(12) United States Patent
Thorson et al.

(10) Patent No.: US 11,940,946 B2
(45) Date of Patent: *Mar. 26, 2024

(54) VECTOR REDUCTION PROCESSOR

(71) Applicant: Google LLC, Mountain View, CA (US)

(72) Inventors: Gregory Michael Thorson, Waunakee, WI (US); Andrew Everett Phelps, Middleton, WI (US); Olivier Temam, Antony (FR)

(73) Assignee: Google LLC, Mountain View, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 17/354,947

(22) Filed: Jun. 22, 2021

(65) Prior Publication Data

US 2021/0318983 A1    Oct. 14, 2021

Related U.S. Application Data

(63) Continuation of application No. 16/918,448, filed on Jul. 1, 2020, now Pat. No. 11,061,854, which is a
(Continued)

(51) Int. Cl.
*G06F 9/30* (2018.01)
*G06F 9/38* (2018.01)
(Continued)

(52) U.S. Cl.
CPC ........ *G06F 15/8053* (2013.01); *G06F 9/3001* (2013.01); *G06F 9/30036* (2013.01);
(Continued)

(58) Field of Classification Search
CPC ................. G06F 9/30036; G06F 15/8053
See application file for complete search history.

(56) References Cited

U.S. PATENT DOCUMENTS

| 4,839,845 A | 6/1989 | Rusterholz et al. |
| 5,423,051 A | 6/1995 | Fuller et al. |

(Continued)

FOREIGN PATENT DOCUMENTS

| CN | 101133389 A | 2/2008 |
| CN | 101206588 A | 6/2008 |

(Continued)

OTHER PUBLICATIONS

CN Office Action issued in Chinese Application No. 201810118791.6, dated Mar. 26, 2019, 12 pages.
(Continued)

*Primary Examiner* — Michael J Metzger
(74) *Attorney, Agent, or Firm* — Fish & Richardson P.C.

(57) ABSTRACT

A vector reduction circuit configured to reduce an input vector of elements comprises a plurality of cells, wherein each of the plurality of cells other than a designated first cell that receives a designated first element of the input vector is configured to receive a particular element of the input vector, receive, from another of the one or more cells, a temporary reduction element, perform a reduction operation using the particular element and the temporary reduction element, and provide, as a new temporary reduction element, a result of performing the reduction operation using the particular element and the temporary reduction element. The vector reduction circuit also comprises an output circuit configured to provide, for output as a reduction of the input vector, a new temporary reduction element corresponding to a result of performing the reduction operation using a last element of the input vector.

20 Claims, 8 Drawing Sheets

Related U.S. Application Data continuation of application No. 16/129,663, filed on Sep. 12, 2018, now Pat. No. 10,706,007, which is a continuation of application No. 15/477,791, filed on Apr. 3, 2017, now Pat. No. 10,108,581.

(51) Int. Cl.
  *G06F 15/80* (2006.01)
  *G06F 17/16* (2006.01)
  *G06N 3/084* (2023.01)

(52) U.S. Cl.
  CPC .......... *G06F 9/3877* (2013.01); *G06F 9/3897* (2013.01); *G06F 17/16* (2013.01); *G06N 3/084* (2013.01)

(56) References Cited

U.S. PATENT DOCUMENTS

| | | | |
|---|---|---|---|
| 8,447,954 | B2 | 5/2013 | Jia |
| 8,458,243 | B1 | 6/2013 | Demirsoy et al. |
| 9,141,386 | B2 | 9/2015 | Wiedemeier |
| 9,959,247 | B1 * | 5/2018 | Woo .................. G06F 7/76 |
| 2005/0071413 | A1 | 3/2005 | Schulte et al. |
| 2006/0041610 | A1 | 2/2006 | Hokenek et al. |
| 2009/0150648 | A1 | 6/2009 | Mejdrich |
| 2010/0049950 | A1 | 2/2010 | Gonion |
| 2010/0325398 | A1 | 12/2010 | Gonion |
| 2012/0281930 | A1 | 11/2012 | Darouich et al. |
| 2013/0311530 | A1 | 11/2013 | Lee et al. |
| 2014/0095842 | A1 | 4/2014 | Capriolo et al. |
| 2014/0189288 | A1 | 7/2014 | Hartono et al. |
| 2015/0052330 | A1 | 2/2015 | Ingle et al. |
| 2015/0212972 | A1 | 7/2015 | Boettcher et al. |
| 2016/0179537 | A1 | 6/2016 | Kunzman |
| 2016/0342889 | A1 | 11/2016 | Thorson et al. |
| 2018/0113708 | A1 * | 4/2018 | Corbal ............... G06F 9/30109 |

FOREIGN PATENT DOCUMENTS

| | | |
|---|---|---|
| CN | 101236511 A | 8/2008 |
| CN | 103995688 A | 8/2014 |
| CN | 104603766 A | 5/2015 |
| CN | 104813279 A | 7/2015 |
| EP | 1936492 | 6/2008 |
| JP | H08-077142 | 3/1996 |
| JP | 3334330 B2 | 10/2002 |
| JP | 2004-013185 | 1/2004 |
| JP | 2007-533009 | 11/2007 |
| JP | 2012-239169 | 12/2012 |
| JP | 2016-530631 | 9/2016 |
| KR | 1019980070438 A | 10/1998 |
| KR | 10-1005718 | 1/2011 |
| KR | 1020130064794 A | 6/2013 |
| KR | 10-2015-0074079 | 7/2015 |
| TW | 201514850 | 4/2015 |
| TW | 201643705 | 12/2016 |
| TW | 201643705 A | 12/2016 |
| WO | WO 2007/049150 | 5/2007 |
| WO | WO 2010/087144 | 8/2010 |
| WO | WO 2014051720 A | 4/2014 |
| WO | WO 2015/073333 | 5/2015 |

OTHER PUBLICATIONS

EP Office Action in European Application No. 17829778.4, dated Dec. 10, 2020, 9 pages.
International Search Report and Written Opinion issued in International Application No. PCT/US2017/066058, dated Mar. 28, 2018, 16 pages.
KR Office Action in Korean Application No. 10-2019-7020740, dated Sep. 25, 2020, 8 pages (with English translation).
Langhammer et al. "Floating-Point DSP Block Architecture for FPGAs," Proceedings of the 2015 ACM.SIGDA International Symposium on Field-Programmable Gate Arrays, Feb. 1, 2015, 9 pages.
PCT International Preliminary Report on Patentability in International Application No. PCT/US2017/066058, dated Oct. 8, 2019, 9 pages.
TW Office Action issued in Taiwanese Application No. 107100277, dated Dec. 10, 2018, 8 pages (English translation).
KR Notice of Allowance in Korean Appln. No. 10-2021-7043370, dated Oct. 15, 2022, 2 pages (with English Translation).
TW Office Action in Taiwan Application No. 110130102, Feb. 18, 2022, 6 pages (with English translation).
Extended European Search Report in European Appln. No. 22177238.7, dated Oct. 11, 2022, 6 pages.
JP Office Action in Japanese Application No. 2019-538667, dated Aug. 24, 2021, 7 pages (with English translation).
Office Action in Chinese Appln. No. 201911179581.9, dated Feb. 25, 2023, 12 pages (with English Translation).
Office Action in Japanese Appln. No. 2023-058509, dated Oct. 24, 2023, 6 pages (with English translation).

* cited by examiner

US 11,940,946 B2

VECTOR REDUCTION PROCESSOR

CROSS-REFERENCE TO RELATED APPLICATIONS

This is a continuation of U.S. application Ser. No. 16/918,448, filed on Jul. 1, 2020, which is a continuation of U.S. application Ser. No. 16/129,663, filed on Sep. 12, 2018 (now U.S. Pat. No. 10,706,007), which is a continuation of U.S. application Ser. No. 15/477,791, filed on Apr. 3, 2017 (now U.S. Pat. No. 10,108,581). The disclosures of the prior applications are considered part of and are incorporated by reference in the disclosure of this application.

BACKGROUND

The specification relates to performing vector reductions in hardware.

Generally, a vector reduction is an operation performed on elements of an input vector to produce a scalar output, or an output vector that has a smaller dimensionality than the input vector. For example, a summation vector reduction operation may produce a scalar output that is equal to a sum of the elements of an input vector. In some examples, respective vector reduction operations may be performed on multiple segments of an input vector. A segmented vector reduction operation produces an output vector in which each element is a reduction of a segment of the input vector. For example, a segmented summation vector reduction operation may produce an output vector in which each element is a sum of a segment of elements of the input vector.

SUMMARY

In general, this specification describes a special-purpose hardware circuit that computes vector reductions.

In general, one innovative aspect of the subject matter described in this specification can be embodied in a vector reduction circuit configured to reduce an input vector of elements, the vector reduction circuit comprising a plurality of cells, wherein each of the plurality of cells other than a designated first cell that receives a designated first element of the input vector is configured to receive a particular element of the input vector, receive, from another of the plurality of cells, a temporary reduction element, perform a reduction operation using the particular element and the temporary reduction element, and provide, as a new temporary reduction element, a result of performing the reduction operation using the particular element and the temporary reduction element. The vector reduction circuit comprises an output circuit configured to provide, for output as a reduction of the input vector, a new temporary reduction element corresponding to a result of performing the reduction operation using a last element of the input vector.

Implementations can optionally include one or more of the following features. In some implementations, the reduction operation is a maximum value reduction operation, and performing the reduction operation using the particular element and the temporary reduction element comprises comparing the particular element and the temporary reduction element, and determining, based at least on the comparison and as the result of performing the reduction operation using the particular element and the temporary reduction element, a maximum of the particular element and the temporary reduction element; the reduction operation is a maximum value reduction operation, and performing the reduction operation using the particular element and the temporary reduction element comprises comparing the particular element and the temporary reduction element, and determining, based at least on the comparison and as the result of performing the reduction operation using the particular element and the temporary reduction element, a maximum of the particular element and the temporary reduction element.

Implementations can also optionally include one or more of the following features. In some implementations, the reduction operation is a summation reduction operation, and performing the reduction operation using the particular element and the temporary reduction element comprises determining, as the result of performing the reduction operation using the particular element and the temporary reduction element, a sum of the particular element and the temporary reduction element; the reduction operation is a product reduction operation, and performing the reduction operation using the particular element and the temporary reduction element comprises determining, as the result of performing the reduction operation using the particular element and the temporary reduction element, a product of the particular element and the temporary reduction element.

Implementations can also optionally include one or more of the following features. In some implementations, the reduction operation is a maximum index operation, and performing the reduction operation using the particular element and the temporary reduction element comprises receiving data indicating an index corresponding to the temporary reduction element, comparing the particular element and the temporary reduction element, determining, based at least on the comparison, a maximum of the particular element and the temporary reduction element, and identifying, based at least on the determination and as the result of performing the reduction operation using the particular element and the temporary reduction element, one of an index corresponding to the particular element or the index corresponding to the temporary reduction element.

Implementations can also optionally include one or more of the following features. In some implementations, the reduction operation is a minimum index operation, and performing the reduction operation using the particular element and the temporary reduction element comprises receiving data indicating an index corresponding to the temporary reduction element, comparing the particular element and the temporary reduction element, determining, based at least on the comparison, a minimum of the particular element and the temporary reduction element, and identifying, based at least on the determination and as the result of performing the reduction operation using the particular element and the temporary reduction element, one of an index corresponding to the particular element or the index corresponding to the temporary reduction element.

Implementations can also optionally include one or more of the following features. In some implementations, the particular element of the input vector is received in a staggered input of elements; the input vector is identified as including a plurality of segments of elements; the particular element of the input vector is a designated last element of the particular segment of the input vector, and each of the plurality of cells other than the designated first cell that receives the designated first element of the input vector is configured to provide, to the output circuit and as a reduction of the particular segment of the input vector, a result of performing the reduction operation using the designated last element of the particular segment of the input vector and the temporary reduction element; providing, as a new temporary reduction element, a result of performing the reduction operation using the designated last element of the particular segment of the input vector and the temporary reduction element comprises providing, to another of the plurality of cells and as the new temporary reduction element, a placeholder signal; the output circuit is configured to provide, for output as a reduction of the input vector, a plurality of elements, wherein each of the plurality of elements is a new temporary reduction element corresponding to a result of performing the reduction operation using a designated last element of a segment of the input vector; the output circuit is configured to provide, for output as a reduction of the input vector, an output vector comprising the plurality of elements.

Implementations can also optionally include one or more of the following features. In some implementations, the vector reduction circuit comprises a control register configured to receive a control vector of elements, wherein the control vector of elements specifies the plurality of segments of elements of the input vector; providing, as a new temporary reduction element, a result of performing the reduction operation using the particular element and the temporary reduction element comprises receiving a particular element of the control vector corresponding to the particular element, determining, based at least on the particular element of the control vector, that the particular element is designated as a last element of a particular segment of the input vector, and providing, to the output circuit and based at least on the determining, a result of performing the reduction operation using the particular element designated as a last element of the particular segment of the input vector and the temporary reduction element as a reduction of the particular segment of the input vector.

Implementations can also optionally include one or more of the following features. In some implementations, providing, as a new temporary reduction element, a result of performing the reduction operation using the particular element and the temporary reduction element comprises receiving a particular element of the control vector corresponding to the particular element, determining, based at least on the particular element of the control vector, that the particular element is designated as a last element of a particular segment of the input vector, and providing, to another of the plurality of cells and based at least on the determining, a placeholder signal; providing, as a new temporary reduction element, a result of performing the reduction operation using the particular element and the temporary reduction element comprises receiving a particular element of the control vector corresponding to the particular element, determining, based at least on the particular element of the control vector, that the particular element is not designated as a last element of a particular segment of the input vector, and providing, based at least on the determining, to another of the plurality of cells and as a new temporary reduction element, a result of performing the reduction operation using the particular element that is not designated as a last element of the particular segment of the input vector and the temporary reduction element.

Implementations can also optionally include one or more of the following features. In some implementations, the output circuit provides the reduction of the input vector to a permute circuit configured to compute vector or matrix permutations; each of the plurality of cells is configured to receive a control signal specifying a type of the reduction operation to perform using the particular element and the temporary reduction element; the temporary reduction element corresponds to a result of performing the specified reduction operation on elements of the input vector that precede the particular element of the input vector.

Particular embodiments of the subject matter described in this application can be implemented so as to realize one or more of the following advantages. Vector reductions can be performed in hardware by a special-purpose hardware circuit. The special-purpose hardware circuit is capable of performing the vector reductions in fewer cycles than a general processor (e.g., GPU or CPU). Additionally, by computing vector reductions in hardware using the special-purpose hardware circuit, vector reductions can be performed without passing data back to a host computer, i.e., without performing at least a part of the computation off-chip or in software. As a result, processing delays resulting from computing vector reductions off-chip or in software, where the computation can be an expensive one requiring a greater number of general processor (e.g., GPU or CPU) cycles to perform than in the special-purpose hardware circuit, are avoided.

Using a hardware circuit that is specially designed to compute vector reductions also allows for more efficient processing compared to a system that performs vector reductions in a general matrix or vector processing hardware circuit, e.g., one that is also configured to perform matrix convolutions or other matrix-vector computations, or in another special-purpose hardware circuit, e.g., one that is configured to perform both vector reductions and matrix transpose computations. Implementing vector reduction operations on a dedicated hardware circuit permits a design that efficiently handles vector reductions without concern for other matrix-vector computation capabilities or efficiencies, and reserves other matrix or vector processing circuits for performing other matrix or vector computations, thereby increasing the efficiency of matrix-vector computations in hardware generally.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
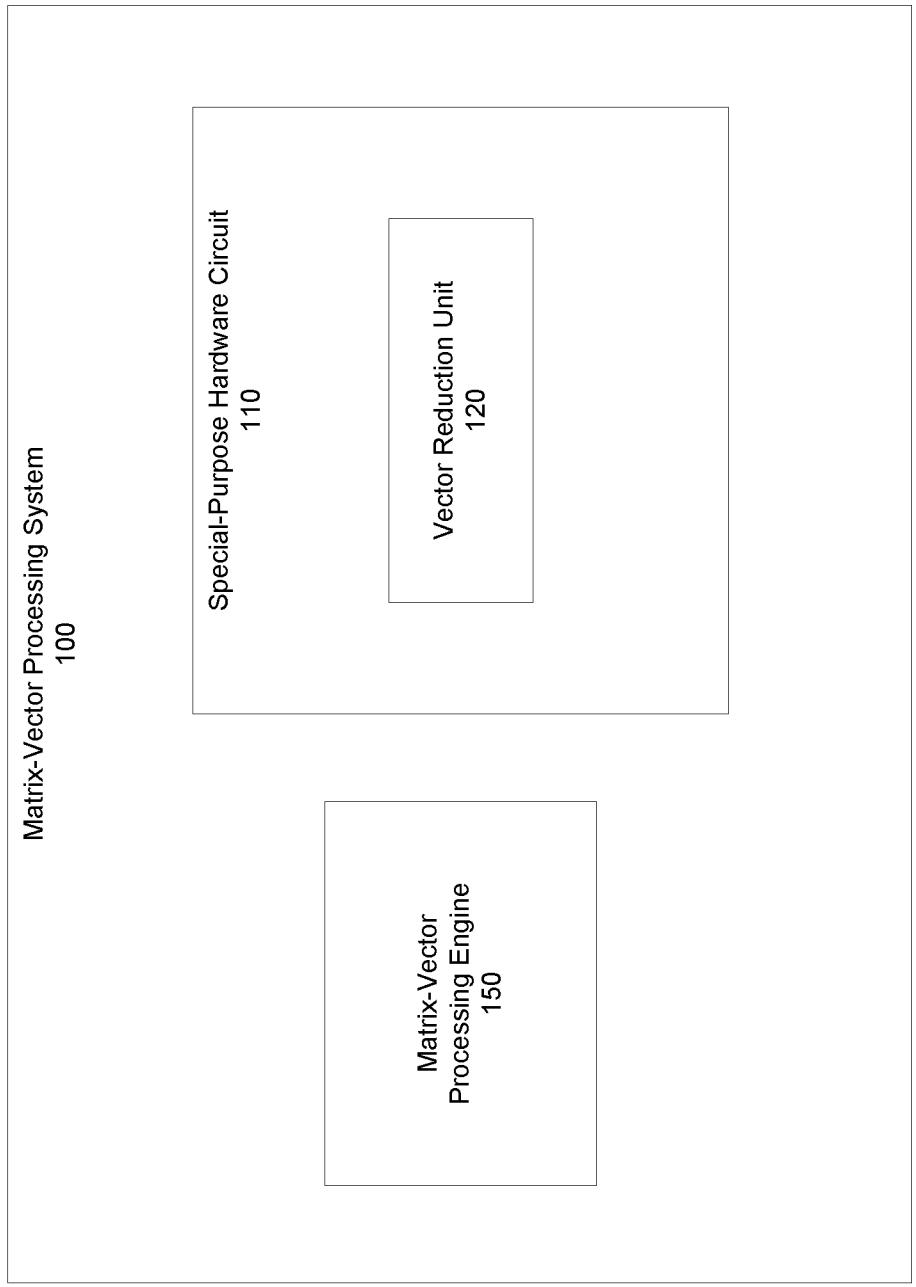
FIG. 1 shows an example matrix-vector processing system.

A vector reduction operation is an operation that is performed on an input vector of elements to generate an output that is a scalar or a vector of elements that is smaller, i.e., has a lower dimensionality, than the input vector. For example, a summation vector reduction operation produces a scalar output that is a sum of the elements of the input vector. As another example, a maximum value or minimum value vector reduction operation produces a scalar output that is the maximum of the elements of the input vector or the minimum of the elements of the input vector, respectively. Similarly, a maximum index or minimum index vector reduction operation produces an output that indicates an index in the input vector of the maximum value or minimum value of the input vector, respectively. Other vector reduction operations are possible, such as a product vector reduction operation that produces a scalar output corresponding to a product of the elements of the input vector, a mean vector reduction operation that produces a scalar output corresponding to an arithmetic mean of the elements of the input vector, and so forth.

In some implementations, an input vector may be segmented, and respective vector reduction operations may be performed on one or more of the segments of the input vector. Performing a respective vector reduction operation on each of multiple segments of the input vector produces an output vector. Each element of the output vector corresponds to a result of performing the vector reduction operation on a corresponding segment of the input vector. For example, the output of a vector reduction operation performed on an input vector divided into three segments would be an output vector of three elements, in which each element of the output vector is a result of applying the vector reduction operation to a different segment of the input vector.

Vector reductions are computed frequently in linear algebra computations and in data analyses for other real-world applications. For example, vector reductions may be computed when training a neural network, e.g., as a part of a machine learning process. In these instances, vector reductions may be used to backpropagate gradients when training a neural network. Vector reductions may also be performed on outputs of a layer of a neural network. A result of a vector reduction may be provided as an input to another layer of the neural network, or may be provided as an output from the neural network. Other applications of vector reductions include multimedia processing, such as in digital audio or video decoding. Signal processing, such as in the fields of analog and digital transmission, radar, and sonar, also frequently utilize vector reduction techniques, e.g., to identify a maximum or minimum in a received or transmitted signal.

In some implementations, input matrices may be decomposed into vectors, and vector reductions may be applied individually to vectors of the input matrix. For instance, an image represented as a matrix, e.g., with elements of the matrix corresponding to pixels of the image, can be decomposed into vectors. Vector reduction operations, such as a mean vector reduction operation, can be applied to the vectors of the input matrix, e.g., to perform image smoothing or to reduce the pixel size of the image.

This specification describes special-purpose hardware circuitry that performs vector reduction operations on input vectors. The special-purpose hardware circuitry can produce scalar or vector outputs corresponding to vector reductions of input vectors.

FIG. 1 shows an example matrix-vector processing system 100. The matrix-vector processing system 100 is an example of a system implemented as one or more computers in one or more locations in which the systems, components, and techniques described below can be implemented.

The matrix-vector processing system 100 is a system that performs vector or matrix computations using a special-purpose hardware circuit 110. The special-purpose hardware circuit 110 is an integrated circuit for performing vector or matrix computations that includes a vector reduction unit 120 configured to compute vector reductions in hardware. An example special-purpose hardware circuit 110 is described in more detail with reference to FIG. 2.

The matrix-vector processing system 100 receives requests to perform vector or matrix computations on the special-purpose hardware circuit 110, controls the special-purpose hardware circuit 110 to perform the vector or matrix computations, and outputs results of the vector or matrix computations generated by the special-purpose hardware circuit 110. For example, the matrix-vector processing system 100 may receive a request to perform a vector reduction on an input vector, and in response may control the special purpose hardware circuit 110 to compute the vector reduction and to and output a result of computing the vector reduction on the input matrix. The special-purpose hardware circuit 110 may be capable of performing additional computations in addition to vector reductions. For example, the special-purpose hardware circuit 110 may also include circuits or other hardware components for computing vector or matrix convolutions, vector or matrix arithmetic, vector or matrix transposes, or other vector or matrix computations, e.g., to process layers of a neural network. As such, the special-purpose hardware circuit 110 may compute a vector reduction as part of performing a larger computation using other components of the special-purpose hardware circuit 110.

To implement matrix or vector computations on the special-purpose hardware circuit 110, the matrix-vector processing system 100 includes a matrix-vector processing engine 150. The matrix-vector processing engine 150 may be implemented as one or more computer programs on one or more computers in one or more physical locations.

The matrix-vector processing engine 150 can generate instructions, provide control signals, or direct data to control the special-purpose hardware circuit 110 to perform vector or matrix computations in response to a request. For example, the matrix-vector processing system 100 may receive a request to apply a function to one or more input vectors or matrices, and the matrix-vector processing engine 150 can determine specific instructions or control signals for performing the computations necessary to apply the function to the input vectors or matrices on the special-purpose hardware circuit 110. The matrix-vector processing engine 150 may also direct data, e.g., corresponding to the input vectors or matrices, that the special-purpose hardware circuit 110 can use to perform the necessary computations.

Once the matrix-vector processing engine 150 determines the computations necessary to implement a vector or matrix request, the matrix-vector processing engine 150 controls the special-purpose hardware circuit 110 to perform the necessary computations. For example, the matrix-vector processing engine 150 may direct data for performing the vector or matrix computations, such as input vectors or matrices, to the special-purpose hardware circuit 110. The matrix-vector processing engine 150 may also transmit instructions or control signals to the special-purpose hardware circuit 110 to control the special-purpose hardware circuit 110 to perform the necessary computations on the data received by it from the matrix-vector processing engine 150.

For example, the matrix-vector processing system 100 can receive a request to perform a vector or matrix computation. The requested computation may be relatively simple, e.g., a request to perform a simple linear algebra computation, or a more complex function, e.g., one for backpropagating gradients to train a neural network. The requested computation may require one or more operations, such as one or more vector reductions. The request may also identify or include one or more vectors or matrices on which to perform the computations, i.e., one or more input vectors or matrices to which a function is applied. The matrix-vector processing engine 150 can receive the request and can generate control signals or instructions to perform the computations on the input vectors or matrices. The matrix-vector processing engine 150 may furthermore direct the input vectors or matrices to the special-purpose hardware circuit 110.

For example, to compute a vector reduction, e.g., as a part of a larger computation, the matrix-vector processing engine 150 may provide the special-purpose hardware circuit 110 with a received input vector, or with multiple vectors obtained by decomposing an input matrix into its vector components. The matrix-vector processing engine 150 may also provide the special-purpose hardware circuit 110 with control signals for initiating the vector reduction or parameters for performing the vector reduction on the vector reduction unit 120. The vector reduction unit 120 may receive the input vector or vectors and the control signals provided to the special-purpose hardware circuit 110. The vector reduction unit 120 can perform the vector reduction in response to receiving the control signals, and can output a result of performing the vector reduction. The result generated by the vector reduction unit 120 may be used in other operations performed by the special-purpose hardware circuit 110 to perform the requested computation. The special-purpose hardware circuit 110 may provide a result of the requested computation, which the matrix-vector processing system 100 can return in response to the request.

Figure 2:
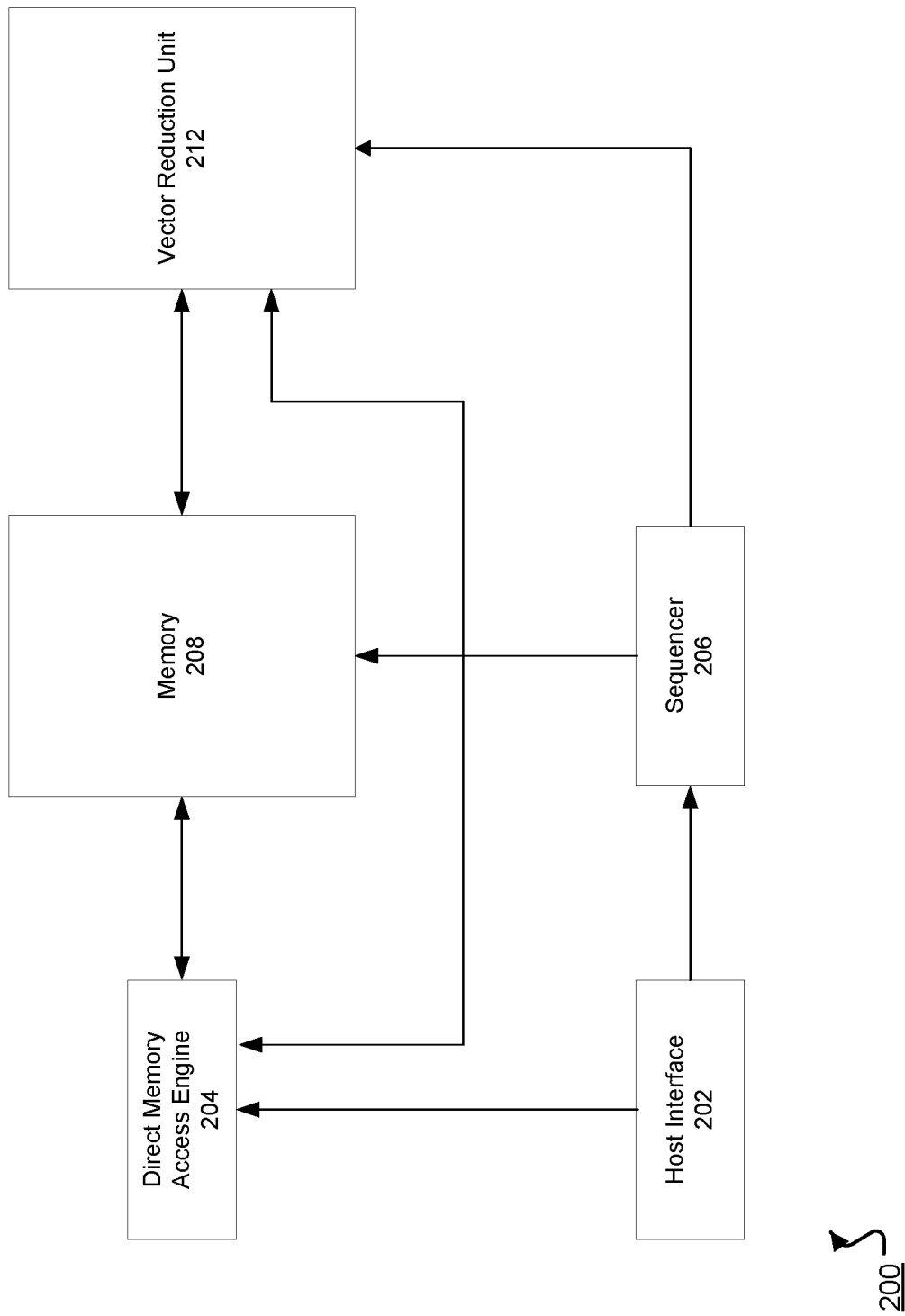
FIG. 2 shows an example matrix-vector processing system including a vector reduction unit.

FIG. 2 shows an example special-purpose hardware circuit 200 capable of performing vector reductions. In some implementations, the circuit 200 may include additional components, not shown, for performing other vector or matrix computations. Additional components for performing other vector or matrix may also utilize one or more of the components shown in FIG. 2.

The circuit 200 includes a host interface 202. The host interface 202 can receive control signals, instructions, or arguments for performing vector or matrix computations, including vector reductions. Arguments can include, for example, one or more vectors on which to perform vector reductions. Instructions or control signals received by the host interface 202 can include instructions indicating where to store the received arguments so that the circuit 200 may perform the vector reductions, may include parameters relating to the requested vector reductions, or may include other information, e.g., a memory location for storing an output of the vector reductions. A control signal received by the host interface 202 may also control the circuit 200 to initiate vector reduction computations.

In some implementations, the host interface 202 can provide instructions to the sequencer 206, which converts the instructions into low-level control signals that control the circuit 200 to perform the vector reduction. For example, the control signals generated by the sequencer 206 may regulate dataflow in the circuit 200, e.g., where an input vector should be stored or how that data should otherwise be directed through the circuit 200. The sequencer 206 may receive an instruction to initiate a vector reduction computation on the circuit 200, and may generate a control signal for controlling a vector reduction unit 212 to initiate the vector reduction computation.

The sequencer 206 can send the control signals to memory 208 and to the vector reduction unit 212. In some implementations, the sequencer 206 also sends control signals to a direct memory access engine 204. In some implementations, the sequencer 206 is a processor that generates control signals. The sequencer 206 can coordinate the control signals to send the control signals to the appropriate components of the circuit 200 at the appropriate times. In some instances, the sequencer 206 may receive control signals from the host interface 202 that are passed in externally from the circuit 200, e.g., from the vector-matrix processing engine 150 of FIG. 1, such that the sequencer 206 is not required to generate control signals. In such instances, the sequencer 206 may send the received control signals to the components of the circuit 200 at appropriate times. Moreover, where the circuit 200 is provided control signals, the sequencer 206 may be an optional component of the circuit 200, i.e., such that a component external to the circuit 200, e.g., the matrix-vector processing engine 150, may provide the control signals at the appropriate times to control the circuit 200 to perform operations, including those for performing vector reductions.

The host interface 202 can send an argument, e.g., an input vector, to the direct memory access engine 204. The direct memory access engine 204 can store the argument at the memory 208.

The memory 208 may be a dynamic memory, e.g., a dynamic random-access memory (DRAM), or may be a static memory, e.g., a static random-access memory (SRAM). The memory 208 may be used, in some implementations, as a memory buffer. The memory 208 may be located on or off of the circuit 200. It can store an argument, e.g., a vector, input to the circuit 200, or parameters for performing a vector reduction. The memory 208 may also store outputs of the vector reduction unit 212, i.e., a result of performing a vector reduction on an input vector. The direct memory access engine 204 may, in some implementations, read from the memory 208. For example, the direct memory access engine 204 may read from the memory 208 to return, from the circuit 200, a result of performing a vector reduction on an input vector.

The vector reduction unit 212 can access an argument at the memory 208. For example, after the direct memory access engine 204 stores an input vector in the memory 208, the input vector may be provided or made accessible to the vector reduction unit 212, so that the vector reduction unit 212 may perform operations for a vector reduction on the input vector.

The vector reduction unit 212 is a circuit for computing vector reductions. In some implementations, the vector reduction unit 212 is designed to compute a vector reduction based on receiving an argument, e.g., an input vector, and information specifying the type of vector reduction, e.g., whether the vector reduction is to be a summation vector reduction, a maximum value or minimum value vector reduction, etc. Information specifying the type of vector reduction may include other information, e.g., information for performing a segmented vector reduction. In some implementations, the vector reduction unit 212 may be configured to perform a predetermined vector reduction operation, such that only an argument, i.e., input vector, is necessary for the vector reduction unit 212 to perform vector reduction. For example, the vector reduction unit 212 may be configured to perform only summation vector reduction operations, or to segment vector reductions at predetermined elements of an input vector. After receiving this information, the vector reduction unit 212 may perform a vector reduction without receiving additional control signals or inputs, such that the vector reduction is otherwise automated in the vector reduction unit 212 once it has received the necessary inputs, i.e., the input vector and the vector reduction parameters. In such an implementation, once a vector reduction operation has been initiated, the vector reduction unit 212 may perform an entire vector reduction based on the received information and without requiring additional instructions from off-chip. In some implementations, the vector reduction operations may be triggered in response to the vector reduction unit 212 receiving the necessary information, i.e., such that an initiate signal or other trigger is not required. In other implementations, an initiate signal or other signal may trigger the vector reduction unit 212 to perform vector reduction operations.

Generally, to compute a vector reduction, the vector reduction unit 212 receives a control signal indicating a type of vector reduction operation to perform, e.g., a summation vector reduction, maximum or minimum value vector reduction, or maximum or minimum index vector reduction. For example, the vector reduction unit 212 may receive the control signal from the sequencer 206. An input vector is received as a staggered stream of data, e.g., from the memory 208. The vector reduction unit 212 performs the vector reduction operation indicated by the control signal on the elements of the input vector. For example, the vector reduction unit 212 may perform the vector reduction operation as each element of the input vector is received. Alternatively, the vector reduction engine 212 may receive all elements of the input vector, or a portion of the elements of the input vector, and may perform the vector reduction operation on the elements of the input vector or portion of the input vector after they have been received. In some examples, a result of the vector reduction operation is not dependent on the order of elements of the input vector to which the vector reduction operation is applied, e.g., in the case of a summation vector reduction. In such instances, the vector reduction unit 212 may determine to perform the vector reduction operation on elements of the input vector in a different order than that which the elements are arranged in the input vector, or in a different order from that in which the elements are received by the vector reduction unit 212. After the vector reduction operation has been applied to all of the elements of the input vector, the vector reduction unit 212 may output a result of the vector reduction, e.g., to the memory 208 or to another component of the special-purpose hardware circuit 200.

Since the input to the vector reduction unit 212 may be a staggered input, in some instances the vector reduction unit 212 may be able to perform vector reductions on multiple input vectors simultaneously, e.g., in a pipelined fashion. That is, while a first input vector may be undergoing a vector reduction operation in the vector reduction unit 212, the vector reduction unit 212 may begin performing a vector reduction operation on a second input vector. Additionally, in some examples, a matrix may be provided as an argument to the circuit 200. The input matrix may be decomposed into its vectors, e.g., by obtaining the row or column vectors that together form the input matrix. The vector reduction unit 212 may perform vector reduction operations on the vectors forming the input matrix to generate a vector of vector reduction results. The vector of results may be provided as an output of the vector reduction unit 212, e.g., to another component of the circuit 200.

Figure 3:
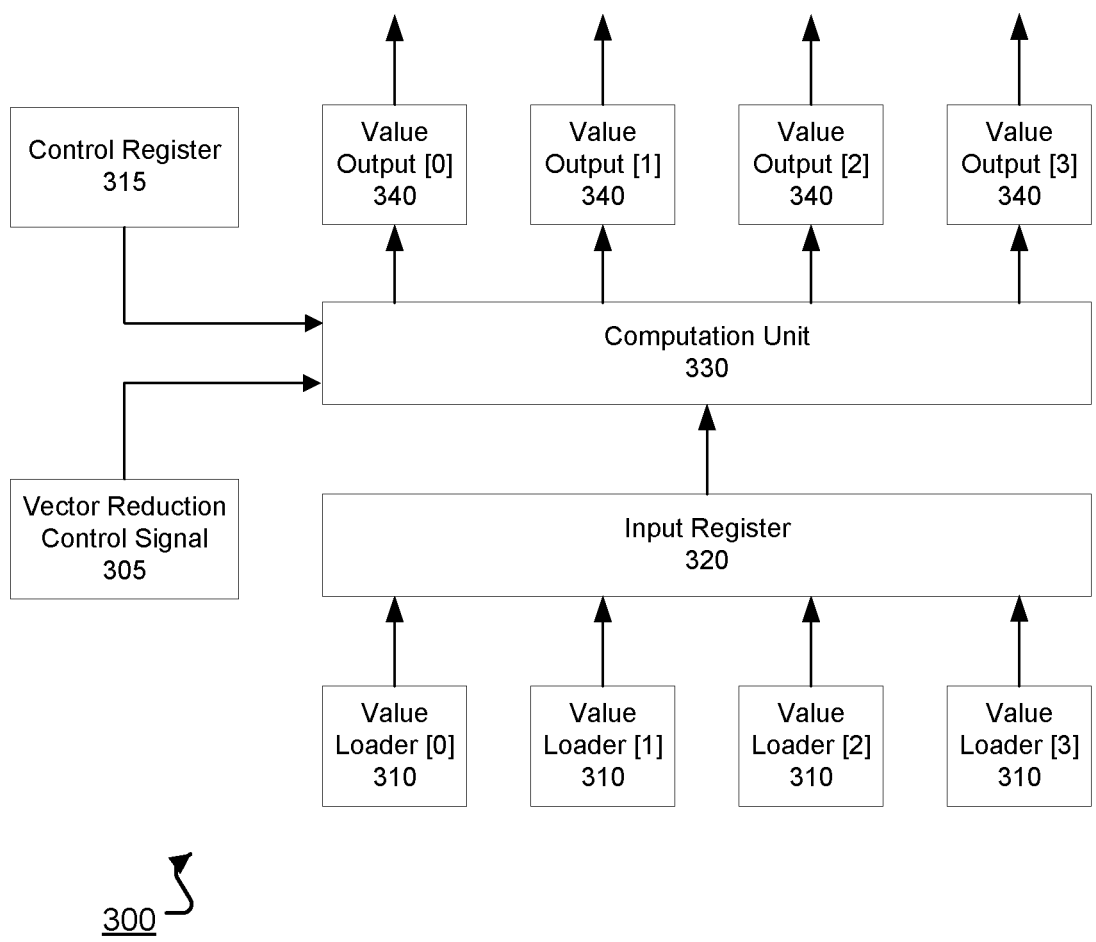
FIG. 3 shows an example architecture of a vector reduction unit in a matrix-vector processing system.

FIG. 3 shows an example architecture of a vector reduction unit 300. The vector reduction unit 300 may be included in a special-purpose hardware circuit of a matrix-vector processing system, e.g., as the vector reduction unit 212 of the special-purpose hardware circuit 200.

Value loaders 310 of the vector reduction unit 300 receive data corresponding to an input vector or vectors. Each of the value loaders 310 corresponds to a lane of data, e.g., received from the memory 208 of the special-purpose hardware circuit 200. In practice, each lane of the data, and therefore each value loader 310, corresponds to a different column or row of an input vector or matrix. Thus, while shown in FIG. 3 as including only the value loaders [0] through [3], thereby enabling reductions of 4×1 or smaller vectors, in other implementations the vector reduction unit 300 may include numerous value loaders 310. For instance, a special-purpose hardware circuit configured to operate on 128×128 element matrices or 128×1 vectors transmitted as 128-lane data may include 128 corresponding value loaders 310.

Data corresponding to an input vector may be received by the value loaders 310 in a staggered fashion. As used in this specification, staggered data is data transmitted in multiple lanes with an offset, such that a data stream in each lane is some multiple of cycles behind a data stream in another lane. For example, a data stream in a first lane corresponding to value loader [0] may be one cycle ahead of a data stream in a second lane corresponding to value loader [1]. This is in contrast to flattened data, in which the data streams in each lane, e.g., received by each of the value loaders 310, are aligned. For example, a vector of elements transmitted across multiple lanes would be received at the value loaders 310 on the same clock cycle.

Generally, the vector reduction unit 300 and other components of the special-purpose hardware circuit that includes the vector reduction unit 300 may be able to perform computations more efficiently on staggered data, by performing certain operations in parallel. For example, as shown in greater detail with respect to FIGS. 4 and 7A-7B, operating on staggered data allows the vector reduction unit 300, or other components for performing matrix transposes or matrix convolutions, to perform certain operations in parallel or to optimize the processing of successive input vectors or matrices. For instance, operating on staggered data corresponding to multiple input vectors enables the vector reduction unit 300 to perform vector reduction operations on the multiple input vectors during the same cycle. As shown in more detail in FIG. 4, the vector reduction unit 300 can receive staggered data such that elements of different input vectors may be provided to the vector reduction unit 300 during the same cycle. The vector reduction unit 300 can then perform operations for computing reductions of the different input vectors during a single cycle.

The value loaders 310 receive data corresponding to an input vector, and provide the data to the input register 320. Where the data received by a particular value loader 310 does not correspond to elements of the input vector, or to elements of another input vector, the particular value loader 310 may ignore or discard the data. In those instances, the input register 320 may not receive data from the particular value loader 310, may receive a null, positive, or negative infinity value, or may receive other data signifying that the element received from the particular value loader 310 does not include an element of the input vector. For instance, if a 3×1 input vector is received by the value loaders 310, values received by value loader [3] may be ignored or discarded, as they do not correspond to elements of the input vector. If, however, the value received by value loader [3] corresponds to a preceding input vector, e.g., a 4×1 input vector whose first element was received before the first element of the 3×1 input vector, the value received at value loader [3] may be provided to the input register 320.

In some implementations, the vector reduction unit 300 is configured to perform vector reduction operations only while vector input data is being processed by the reduction unit 300. For example, a vector reduction operation may be triggered when a first element of an input vector is received. This may improve the efficiency of the circuit, e.g., by consuming less power, and may ensure that other data received by the input register 320 before the first element of the input vector that does not correspond to an element of another input vector does not affect a result of performing vector reduction on the input vector. For example, because the value loaders 310 receive staggered data, if a vector reduction operation is triggered when a first element of the input vector is received at value loader [0], any data received during previous cycles would not affect a result of reducing the input vector. The input register 320 receives and stores the data corresponding to the input vector. For example, as the value loaders 310 receive elements of an input vector and transmits the elements to the input register 320, the elements may be stored at the input register. The input register 320 may include the same or more elements than there are value loaders 310, in order to receive the data from the value loaders 310. Because the data received by the value loaders 310 is staggered, the input register 320 at any point will not include all of the elements of the input vector, but rather will typically include only a single element of the input vector. Moreover, because the data is staggered, when successive input vectors are received by the vector reduction unit 300, the input register 320 may include elements of multiple input vectors simultaneously.

A computation unit 330 of the vector reduction unit 300 receives or accesses the elements stored at the input register 320. The computation unit 330 may include multiple cells that each correspond to an element of the input register 320 or a particular value loader 310. For example, if the vector reduction unit 300 includes 4 value loaders 310, the computation unit 330 may include 4 cells for performing vector reduction operations.

The computation unit 330 also receives a vector reduction control signal 305 and data from a control register 315. The vector reduction control signal 305 may specify a particular type of vector reduction operation that the computation unit 330 is to perform. For example, the vector reduction control signal 305 may specify a summation vector reduction operation, maximum value reduction operation, a minimum vector reduction operation, a maximum index vector reduction operation, a minimum index vector reduction operation, a product vector reduction operation, a mean vector reduction operation, or another vector reduction operation. The vector reduction unit 300 may receive the vector reduction control signal 305 from the sequencer 206 of the special-purpose hardware circuit 200, from the matrix-vector processing engine 150 of the matrix-vector processing system 100, or from another source.

The control register 315 may receive and store a control vector. The control vector specifies whether and how the computation unit 330 should perform segmented vector reduction on a received input vector. As discussed in greater depth with respect to FIG. 4, the control vector includes elements that may be provided to cells of the computation unit 330 as control signals. The elements may indicate whether each cell of the computation unit 330 should provide a result of a vector reduction operation performed in the cell to another cell of the computation unit 330, or should output the result of the vector reduction operation performed in the cell as a reduction of a segment of the input vector. Put another way, each element of the control vector may be provided as a control signal to a corresponding cell indicating whether that cell is processing an endpoint of a segment of the input vector.

When a result of a vector reduction operation is provided from one cell to another cell, segmented vector reduction does not occur at that cell. Thus, for example, if all of the cells or all but a last cell each receive a control signal controlling the cell to provide a result of the vector reduction operation performed in the cell to another cell of the computation unit 330, the vector reduction operation indicated by the vector reduction control signal 305 is applied to all of the elements of the input vector. Thus, the output of the computation unit 330, e.g., of a last cell of the computation unit 330, will be a result of an unsegmented vector reduction operation that reduces the entire input vector to generate a single result.

When a particular cell of the computation unit 330 does not provide a result of a vector reduction operation to another cell, i.e., when a segmented vector reduction operation does occur, a placeholder signal, such as a null, i.e., zero, or positive or negative infinity may be provided from the particular cell to another cell of the computation unit 330. The result is a segmented reduction occurring at the element of the input vector received by the particular cell, since a result of a vector reduction operation performed by the particular cell is output as a segmented vector reduction for those elements of the input vector up to and including the element of the input vector received by the particular cell. Since a null or positive or negative infinity is provided by the particular cell to another cell of the computation unit 330, this effectively starts a new vector reduction computation for the remaining elements of the input vector, thereby producing a second portion of the segmented vector reduction for the remaining elements of the input vector.

The cells of the computation unit 330 perform reduction operations to generate a result of the input vector reduction. Each cell may process a particular element of the input vector. To do so, as described in greater detail at FIG. 4, a cell receives a temporary reduction element, which is either a result of a vector reduction operation performed by a preceding cell of the computation unit 330, or a placeholder signal or initialization value, e.g., null or positive or negative infinity. The cell also receives a particular element of the input vector, and performs the vector reduction operation specified by the vector reduction control signal 305 using the temporary reduction element and the particular element of the input vector. If a segmented reduction operation is not requested, the cell then provides a next cell of the computation unit 330 with a result of performing the specified vector reduction operation. If a segmented reduction operation is requested, the cell provides a placeholder, e.g., null or positive or negative infinity, to the next cell. The cell will also output the result of performing the specified vector reduction operation, corresponding to a result of performing the segmented vector reduction for elements of the input vector preceding and including the particular element of the input vector. If a segmented vector reduction operation is not requested, a result of performing the specified vector reduction operation using a last element of the input vector, corresponding to a result of performing the vector reduction operation on all elements of the input vector, may be provided for output.

The outputs of the vector reduction processes performed by the computation unit 330 are received by the value outputs 340, which are capable of receiving the outputs and writing the outputs in a staggered fashion. Because any of the cells of the computation unit 330 may be configured to provide a result of a vector reduction, the vector reduction unit 300 includes the value outputs [0] through [3] corresponding to the cells of the computation unit 330. For example, if a second cell of the computation unit 330 receives a signal from the control register 315 indicating that the cell should perform segmented vector reduction at that cell, the second cell of the computation unit 330 may provide an output to value output [1]. If segmented vector reduction is not indicated, then a result of the vector reduction may be provided for output from a last cell of the computation unit 330 corresponding to value output [3]. In some instances, only a single value output 340 may be required, e.g., such that the outputs from the cells of the computation unit 330 all output to the same value output 340. Where a segmented vector reduction operation is requested, the value outputs vector reduction unit 300 may output a vector of results, where each element of the vector is a reduction of a segment of an input vector. The value outputs 340 may provide the elements of the output vector to a register, e.g., an output register, such that the results of the segmented input vector reductions may be provided for output in vector format together, e.g., as an output vector output from the vector reduction unit 300 in a staggered fashion.

The value outputs 340 can receive the vector reduction results from the computation unit 330 and can output the results to a memory of the special-purpose hardware circuit, e.g., the memory 208, to another component of the special-purpose hardware circuit, e.g., a matrix or vector permute unit, or to a location off-chip, such as to the matrix-vector processing engine 150 or another destination external to the matrix-vector processing system 100.

Figure 4:
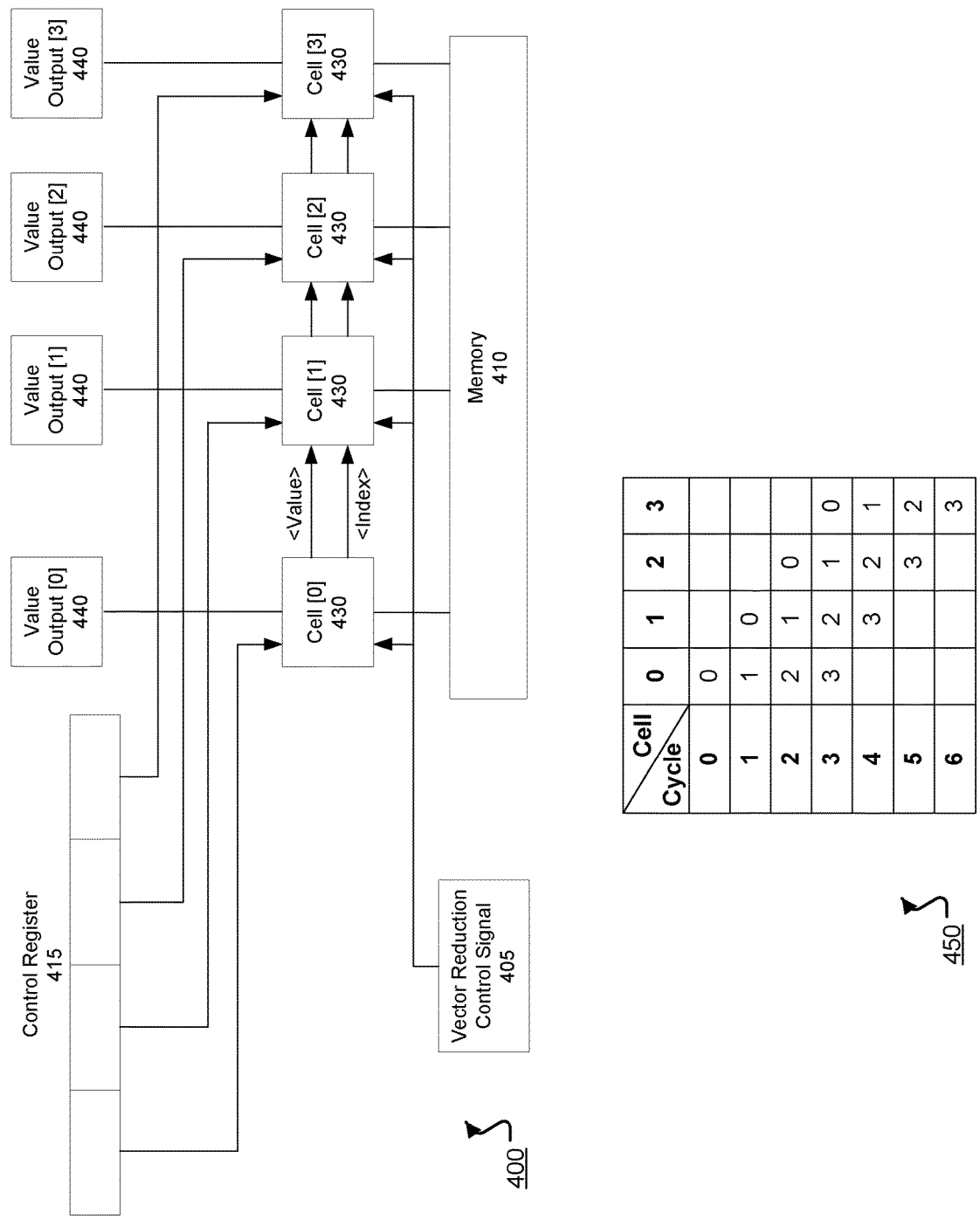
FIG. 4 shows an example architecture of a vector reduction unit in a matrix-vector processing system.

FIG. 4 depicts an example architecture 400 for a computation unit of a vector reduction unit. The architecture 400 includes a memory 410, e.g., similar to a memory 208 of FIG. 2, a vector reduction control signal 405, e.g., similar to the vector reduction control signal 305 of FIG. 3, a control register 415, e.g., similar to the control register 315 of FIG. 3, and value outputs 440, e.g., similar to the value outputs 340 of FIG. 3. The architecture also includes cells 430 corresponding to the cells of the computation unit 330 of FIG. 3.

The cells 430 each receive a lane of staggered data from the memory 410. In some example, the cells 430 may receive the data from value inputs similar to the value loaders 310 of FIG. 3, which are not shown in FIG. 4. For example, the chart 450 may show how data is written across each of four lanes, corresponding to the four cells [0] to [3], in a staggered fashion. Thus, at cycle 0, cell [0] may receive a first element of input vector [0], at cycle 1, cell [0] may receive a first element of input vector [1] and cell [1] may receive a second element of input vector [0], and so forth.

Each cell 430 also receives a vector reduction control signal 405 that specifies a vector reduction operation to perform. As shown in FIG. 4, the same vector reduction control signal 405 may be provided to each of the cells 430. In other implementations, however, different vector reduction control signals may be provided to each, or to subsets of, the cells 430. Providing different vector reduction control signals to different cells 430 can enable the architecture 400 to perform different types of vector reduction operations simultaneously. For example, control signals may be provided to the cells 430 to cause the cells 430 to perform a summation vector reduction on a first input vector and a maximum value vector reduction on a second input vector. The staggered input of the input vectors may enable the cells 430 to perform these different vector reduction operations simultaneously. Similarly, if a segmented vector reduction operation is performed, a first segment of an input vector may be subjected to a first type of vector reduction operation, e.g., a summation vector reduction, and a second segment of the input vector may be subjected to a second type of vector reduction operation, e.g., a maximum value vector reduction operation. In some implementations, the cells 430 are configured to perform a single type of vector reduction operation, or to segment a vector reduction operation at a same element position for each input vector. In these implementations, the vector reduction control signal 405 or control register 415 may be optional components of the architecture 400.

Each cell 430 also receives an element of a control vector stored at the control register 415, which operates as a control signal for controlling segmented vector reductions in the architecture 400. The control register 415 may receive a vector of control signals or may receive individual control signals to store at specific elements of the control register 415. Each control signal may specify a value interpreted by a cell 430 to indicate whether the cell 430 should perform a segmented vector reduction operation at the cell 430, or to perform an unsegmented vector reduction operation at the cell 430.

For example, a value of zero received by the cell 430 from the control register 415 may indicate that the cell 430 should not perform a segmented vector reduction operation at the cell 430, i.e., that the cell 430 is not receiving an element of the input vector that is to be treated as an endpoint of a segment of the input vector. To perform an unsegmented vector reduction operation, the cell 430 may receive a temporary reduction element, shown as <value> in FIG. 4, which corresponds to an initialization value or placeholder signal, e.g., a null or positive or negative infinity, or a result of a previous vector reduction operation from a preceding cell 430. The cell 430 may also receive an index, shown in FIG. 4 as <index>, indicating a specific cell 430 corresponding to a lane of the staggered input data, e.g., for use in performing maximum index or minimum index vector reduction operations. In some implementations, the index may be a memory location, e.g., a location in memory 208 where the input vector was or is stored. The cell 430 also receives an element of an input vector from the memory 410. The cell 430 performs the vector reduction operation specified by the vector reduction control signal 405, and provides a result of the vector reduction operation and, optionally, an index resulting from the vector reduction operation, to a next cell 430 of the architecture 400. Optionally, the cell 430 may also provide these results to a value output 440. A next cell 430 can receive the results of the vector reduction operation from the cell 430, and can use the results in a vector reduction operation performed at the next cell 430. Alternatively, if a value of one is received by the cell 430, the cell 430 may perform a segmented vector reduction operation, such that the cell 430 treats a received element of the input vector as an endpoint of a segment of the input vector. To do so, the cell 430 outputs the result of a vector reduction operation performed at the cell 430 as a result of performing the vector reduction operation on the segment of the input vector ending with the received element. To perform the segmented vector reduction operation, the cell 430 may receive a temporary reduction element, which corresponds to an initialization value or a result of a previous vector reduction operation from a preceding cell 430. The cell 430 may also receive an index from the preceding cell 430. The cell 430 also receives an element of an input vector from the memory 410. The cell 430 performs the vector reduction operation specified by the vector reduction control signal 405. However, the cell 430 does not provide the result to a next cell 430 of the architecture 400, but rather, provides the result only to a value output 440 as a result of the segmented vector reduction operation. To a next cell 430, the cell 430 sends a null or positive or negative infinity, i.e., as an initialization value or placeholder signal for a next vector reduction that is to begin at the next cell 430.

For example, cell [1] may receive from cell [0] a temporary reduction element, corresponding to a result of the cell [0] performing the vector reduction operation specified by the vector reduction control signal. The result of the vector reduction operation performed by cell [0] may be a first element of input vector [0]. For example, if the vector reduction control signal 405 specifies a summation vector reduction operation, then the result output from cell [0] to cell [1] will be the first element of the input vector [0]. Cell [1] may also receive a second element of the input vector [0]. Cell [1] may then perform the vector reduction operation specified by the vector reduction control signal 405, e.g., a summation vector reduction operation, to produce a result. For example, where the specified vector reduction operation is a summation vector reduction operation, the result will be a sum of the first and second elements of input vector [0].

Based on the control signal received from the [1] position of the control register 415, cell [1] may provide this result to cell [2] or to value output [1], or both. For example, if the control signal is a value of zero, specifying an unsegmented vector reduction operation for cell [1], then cell [1] may provide the result to cell [2], and may optionally also provide the result to value output [1], e.g., to output an intermediate result of the vector reduction operation. If the control signal is a value of one, specifying a segmented vector reduction operation for cell [1], then cell [1] will output the result to value output [1] to output a result of the segmented vector reduction operation, e.g., a summation of the first two elements of input vector [0]. However, cell [1] will not output the result as a temporary reduction element to cell [2]. Rather, cell [1] will provide a null, positive infinity, or negative infinity to cell [2], and cell [2] will use this received value as a temporary reduction element. Thus, when cell [2] receives a third element of input vector [0] from the memory 410, the vector reduction operation performed by cell [2] will be the first operation performed for a second vector reduction operation for a second segment of input vector [0]. The result of the vector reduction operation, or results if a segmented vector reduction operation is performed, are output to the value outputs 440, where they may be provided to other components of the special-purpose hardware circuit 200 or of the matrix-vector processing system 100.

Where the vector reduction operation indicated by the vector reduction control signal 405 species either a minimum index vector reduction operation or maximum index vector reduction operation, the cells 430 may each provide an index indicating a specific cell 430 corresponding to a lane of the staggered input data. In some instances, such an index may always be output from the cells 430 when a vector reduction operation is performed, but may not be usable data unless the vector reduction control signal 405 specifies a maximum or minimum index vector reduction operation. When one of these vector reduction operations is specified by the vector reduction control signal 405, both the <value> and <index> outputs of the cells 430 may be necessary to accurately determine an output. For example, if a maximum index vector reduction operation is specified, cell [0] may output to cell [1] the value of a first element of input vector [0] received by cell [0] as a temporary reduction element, and an index [0] indicating that the first lane of the input data is currently the index with the maximum-valued element. Cell [1] may receive the value from cell [0] and compare the value from cell [0] to a value of a second element of input vector [0]. If the value of the second element of input vector [0] is greater than that of the first element of input vector [0], cell [1] may output to cell [2] the value of the second element of input vector [0] as a temporary reduction element, and may output index [1] to cell [2], indicating that the second lane of the input data is currently the index with the maximum-valued element. This process may be repeated at each cell 430, depending upon whether the control vector specifies a segmented or unsegmented vector reduction operation. After completing the vector reduction operation, the cells 430 output the index value to the value outputs 440, instead of outputting a temporary reduction element, i.e., value.

In some instances, the initialization element used by the system may depend on the vector reduction operation specified by the vector reduction control signal 405. For example, when a summation vector reduction operation is specified, a null value may be used as the initialization value. When a product vector reduction operation is specified, a unity value of one may be used as the initialization value. When a maximum value vector reduction operation or maximum index vector reduction operation is specified, negative infinity may be used as the initialization element. When a minimum value vector reduction operation or minimum index vector reduction operation is specified, positive infinity may be used as the initialization element. In some instances, the initialization value to use for a specific vector reduction operation is indicated or provided by a signal that is received externally from the vector reduction unit 400, e.g., as a second signal similar to the vector reduction control signal 405. In other implementations, the cells 430 may be capable of determining an initialization element based on the vector reduction operation specified by the vector reduction control signal 405. For example, based on the cells 430 receiving a signal specifying a summation vector reduction operation, the cells 430 may determine that null should be used as the initialization element.

Figure 5:
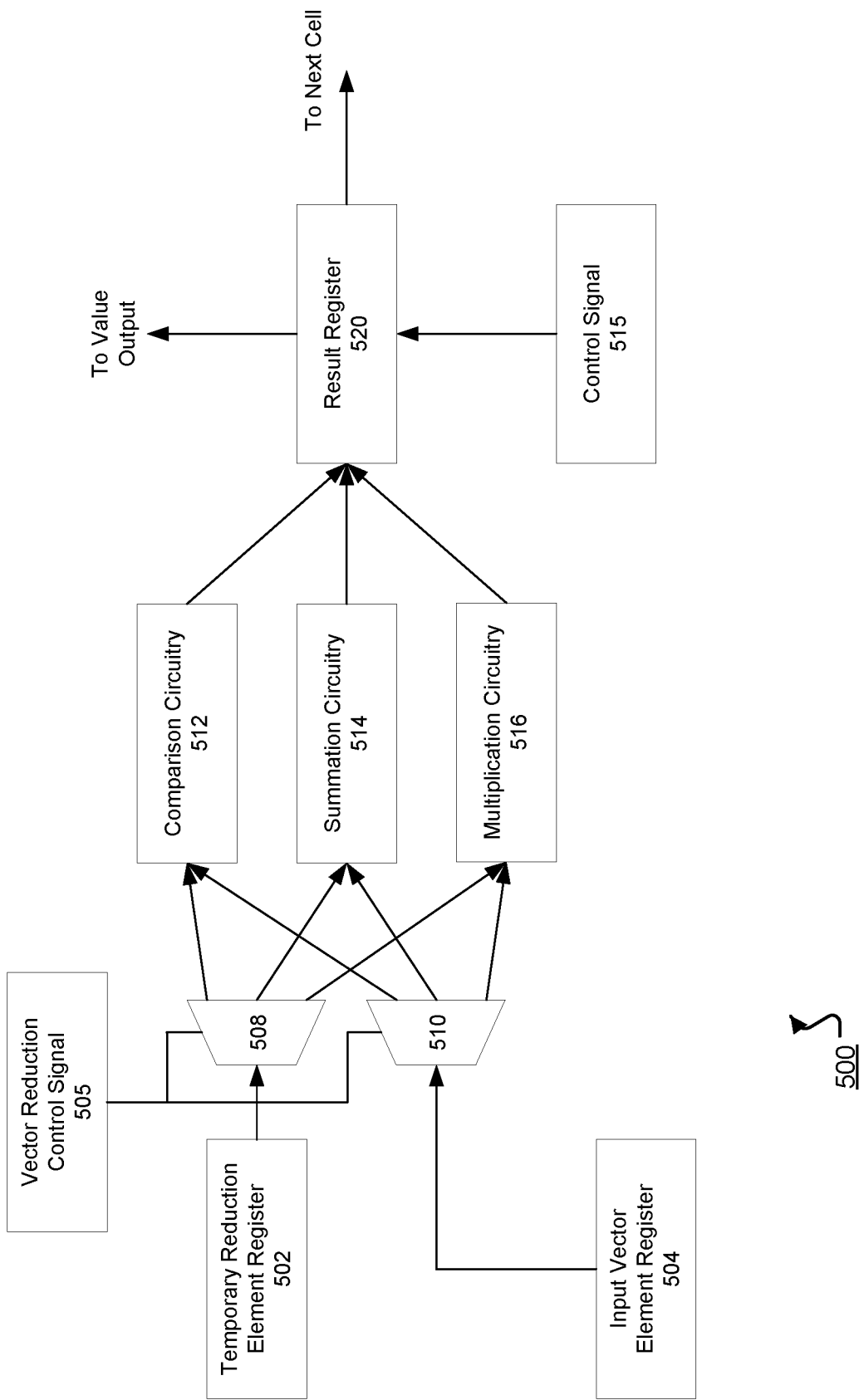
FIG. 5 shows an example architecture of a cell of a vector reduction unit in a matrix-vector processing system.

FIG. 5 shows an example architecture 500 of a cell of a vector reduction unit. For example, each of the cells 430 of FIG. 4 may have an architecture similar to the architecture 500.

The example architecture 500 includes a temporary reduction element register 502 that receives a temporary reduction element. The temporary reduction element may be received from another cell, e.g., from another of the cell 430 of FIG. 4. In some instances, the temporary reduction element register 502 may be initialized, e.g., to a null, positive infinity, or negative infinity value. For example, cell [0] of the vector reduction unit 400 may have its temporary reduction element register 502 initialized to zero, since it does not receive results of vector reduction operations performed by preceding cells. The architecture 500 also includes an input vector element register 504 that receives an element of an input vector. For example, the input vector element register 504 of cell [0] of the vector reduction unit 400 may receive and store a first element of input vector [0], the input vector element register 504 of cell [1] of the vector reduction unit 400 may receive and store a second element of input vector [0], and so forth.

The temporary reduction element may be provided to the multiplexor 508 and the input vector element provided to the multiplexor 510. Each multiplexor 508, 510 may be controlled by the vector reduction control signal 505, such that the vector reduction control signal 505 operates as a select signal for controlling the multiplexors 508, 510 to provide the elements to particular computation circuitry 512, 514, 516.

For example, the vector reduction control signal 505 may indicate that a maximum value vector reduction operation or minimum value vector reduction operation is to be performed, and in response to the signal 505, the multiplexors 508, 510 may provide the temporary reduction element and input vector element to comparison circuitry 512 that is configured to compare the elements to determine a minimum or maximum of the elements. Similarly, if the vector reduction control signal 505 indicates that a summation vector reduction operation is to be performed, the multiplexors 508, 510 may receive the signal 505 and in response provide the temporary reduction element and input vector element to summation circuitry 514 that is configured to sum the elements. If the vector reduction control signal 50 indicates that a product vector reduction operation is to be performed, the multiplexors 508, 510 can provide the temporary reduction element and input vector element to multiplication circuitry 516 configured to compute a product of the elements. Other computation circuitry may also be included in the architecture 500, e.g., index identification circuitry, circuitry for computing an arithmetic mean, or other computation circuitry.

In some implementations, a cell may be configured to perform a single type of vector reduction operation. In such an implementation, a single computation circuit may be included, e.g., only one of the comparison circuitry 512, summation circuit 514, or multiplication circuitry 516. Additionally, in such an implementation the vector reduction control signal 505 would not be necessary for instructing the architecture 500 to perform a specific type of vector reduction operation, and so the vector reduction control signal 505 and multiplexors 508, 510 may be optional.

A result of the computation performed at the computation circuitry 512, 514, 516 is output to result register 520. The result register 520 also receives a control signal 515. The control signal 515 may be an element of the control register 415 of FIG. 4 that corresponds to the particular cell having the architecture 500. For example, if the architecture 500 corresponds to cell [1] of the vector reduction unit 400, the control signal 515 may be a signal corresponding to an element in the [1] position of the control register 415.

The result register 520 outputs the result to one or more components based on the control signal 515. If the control signal 515 indicates that a segmented vector reduction operation is not to occur, e.g., the control signal 515 is a zero, the result register 520 may provide the result received from the computation circuitry 512, 514, 516 to a next cell, e.g., to be received at a temporary reduction element register of a next cell. Optionally, if a segmented vector reduction operation is not to occur, the result register 520 may also output the result to a value output, e.g., one of the value outputs 440 of FIG. 4.

If the control signal 515 indicates that a segmented vector reduction operation is to occur, the result register 520 may provide the result received from the computation circuitry 512, 514, 516 to the value output, e.g., a value output 440 of FIG. 4. The result register may also provide to a next cell, e.g., to a temporary reduction element register of a next cell, a null, positive infinity, or negative infinity value, to segment the vector reduction of the input vector at the cell associated with the architecture 500.

Other cell architectures are also possible. In some implementations, the components of the computation circuitry 512, 514, 516 may be arranged in series. For example, the comparison circuitry 512 may receive the temporary reduction element and the input vector element. An output of the comparison circuitry 512 may be provided as an input to the summation circuitry 514, an output of the summation circuitry 514 may be provided as an input to the multiplication circuitry 516, and an output of the multiplication circuitry 516 may be provided to the result register 520. In such an implementation, the vector reduction control signal 505 may operate to activate or deactivate each component of the computation circuitry 512, 514, 516, such that only one of the vector reduction operations is performed on data as it passes through the components of the computation circuitry 512, 514, 516. Such an architecture would reduce the need for multiplexors 508, 510, although it would require the components of the computation circuitry 512, 514, 516 to interpret the vector reduction control signal 505 in a similar manner. Other architectures are also within the scope of this specification.

Figure 6:
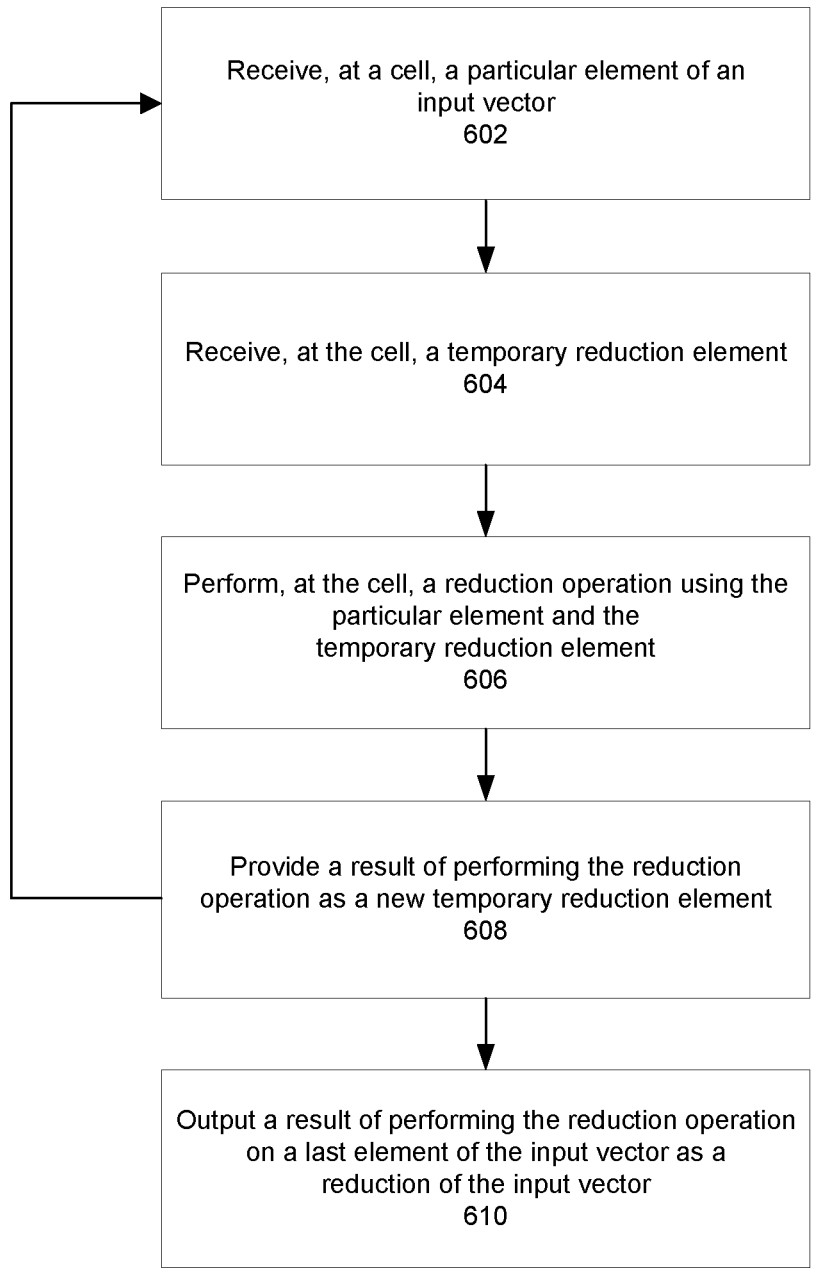
FIG. 6 is a flow diagram of an example method for performing vector reductions in a matrix-vector processing system.

FIG. 6 is an example process 600 for performing a vector reduction on an input vector. In some examples, the input vector may be a vector of an input matrix. Generally, the process 600 may be performed by a system of one or more computers that includes a special-purpose hardware circuit, for example, the special-purpose hardware circuit 110 of FIG. 1 that includes the vector reduction unit 120.

To generate a reduction of the input vector, the system performs a series of operations (602-608). For example, the special-purpose hardware circuit may include a plurality of ells, wherein each of the plurality of cells other than a designated first cell that receives a designated first element of the input vector is configured, for a particular element of the input vector, to perform the operations (602-608) to compute the vector reduction. In some implementations, the designated first cell that receives the designated first element of the input vector may not perform the operations (602-608), since that cell will not receive an output of a preceding cell. Thus, the designated first cell may simply provide the first designated first element of the input vector to a next cell of the system. The other cells each receive an output of a preceding cell, performing the sequence of operations (602-608) to generate their own output, which is provided to a next cell. An output of the last cell of the system, corresponding to the last element of the input vector, is a result of performing the specified vector reduction operation.

A cell receives a particular element of the input vector (602). For example, a particular cell of the circuit may receive a particular element of the input vector. In some implementations, a first register, e.g., an input register, may be configured to receive the elements of the input vector. The data stream providing the elements of the input vector to the input register may be staggered, such that data corresponding to the input vector is received across multiple lanes in a delayed fashion. For example, the data may be staggered such that with each cycle a next element of the input vector is received at the input register. A particular element of the input vector received by the input register is provided to the particular cell of the circuit.

The cell receives, from another of the plurality of cells, a temporary reduction element (606). The temporary reduction element may correspond to a result of performing a reduction operation on elements of the input vector preceding the particular element of the input vector. For example, the particular cell of the circuit may receive a temporary reduction element corresponding to a result of performing a reduction operation on elements of the input vector preceding the received particular element of the input vector. The temporary reduction element may be received from another cell of the one or more cells of the circuit, e.g., may be an output of a preceding cell. As an example, the circuit may perform a vector reduction operation on input vector [0] of FIG. 4. To do so, each of the elements of the input vector [0] is processed at a corresponding cell 430, i.e., such that a first element of input vector [0] is processed at cell [0], a second element of input vector [0] is processed at cell [1], etc. In such an example, the temporary reduction element received by cell [2] will corresponding to a result of performing a reduction operation on the first and second elements of the input vector, i.e., elements of the input vector preceding the third element of the input vector received by cell [2].

The cell performs a reduction operation using the particular element and the temporary reduction element (608). For example, after receiving the particular element of the input vector and the temporary reduction element corresponding to the result of performing the specified vector reduction operation on the elements of the input vector preceding the particular element, the particular cell of the circuit may perform a vector reduction operation specified by a control signal on the received data. Referring again to the example of FIG. 4, after cell [2] receives the third element of input vector [0] and the output of cell [1] as the temporary reduction element, cell [2] may perform a specified vector reduction operation on the elements. For example, if the specified vector reduction operation is a summation vector reduction operation, cell [2] may sum the third element of the input vector [0] and the output of cell [1].

In some implementations, the particular cell of the system may receive a control signal specifying a vector reduction operation to perform using the particular element of the input vector and the temporary reduction element. In some implementations, the control signal may be the same for each of the plurality of cells, i.e., such that a single control signal is received by the circuit and provided to each of the cells. In other implementations, each cell of the circuit may receive a distinct control signal. This enables different cells of the circuit to perform different vector reduction operations at the same time, such as when a segmented vector reduction operation is being performed on an input vector. In such an implementation, the control signals provided to the cells may be received by the circuit, e.g., as a vector at a register, where each element of the vector may be provided as a control signal to a corresponding cell. The type of vector reduction operation may be, for example, a summation vector reduction operation, a maximum value vector reduction operation, a minimum value vector reduction operation, a maximum index vector reduction operation, a minimum index vector reduction operation, a mean vector reduction operation, a product vector reduction operation, or any other vector reduction operation.

The cell provides a result of performing the specified reduction operation using the particular element and the temporary reduction element as a new temporary reduction element (610). For example, the particular cell of the circuit may provide the result of performing the specified reduction operation using the particular element and the temporary reduction element as a new temporary reduction element to another of the plurality of cells. Referring again to the example of FIG. 4, after cell [2] performs the specified vector reduction operation on the third element of the input vector [0] and the temporary reduction element received from cell [1], cell [2] may output the result of the specified vector reduction operation to cell [3] of the circuit. Alternatively, if the particular cell is a cell that performed a vector reduction operation on a last element of the input vector, the resulting temporary reduction element may be provided as an output corresponding to a result of performing vector reduction on the input vector.

The system provides, for output as a reduction of the input vector, a new temporary reduction element corresponding to a result of performing the reduction operation using a last element of the input vector (612). For example, the vector reduction circuit may include output circuitry, e.g., one or more value outputs such as the value outputs 440, for providing a result of performing the vector reduction operation using a last element of the input vector. Since each cell of the circuit performs a vector reduction operation using an element of the input vector and a temporary reduction element corresponding to a result of performing the specified vector reduction operation on elements of the input vector preceding the particular element of the input vector, a result of the specified vector reduction operation that uses the last element of the input vector would be a result of performing the specified vector reduction operation on all elements of the input vector. Thus, this result corresponds to reduction of the input vector. For example, cell [3] of the architecture 400 may perform the specified vector reduction operation on the fourth, i.e., last, element of input vector [0] and the output of cell [2], i.e., the temporary reduction element output by the preceding cell. A result of the vector reduction operation performed by cell [3] will be a result of the vector reduction operation for the entire input vector. Thus, the result may be provided, e.g., to value output [3], for output as the reduction of the input vector.

While discussed as though the one or more cells of the circuit receive and provide data sequentially, e.g., beginning with cell [0] and the first element of input vector [0] and ending with cell [3] and the last element of input vector [0], in other implementations the cells may operate on the input vector in a different order. In those implementations, cells may operate on different elements of the input vector, or cells may receive or provide data to other cells that are not immediately before or after the cell in the sequence. For example, an output of cell [1] may be provided as a temporary reduction element to cell [3], and an output of cell [3] may be provided as a temporary reduction element to cell [2] of the architecture 400 of FIG. 4. In these implementations, the output of the last cell to process an element of the input vector would be the reduction result for the input vector.

Figure 7A:
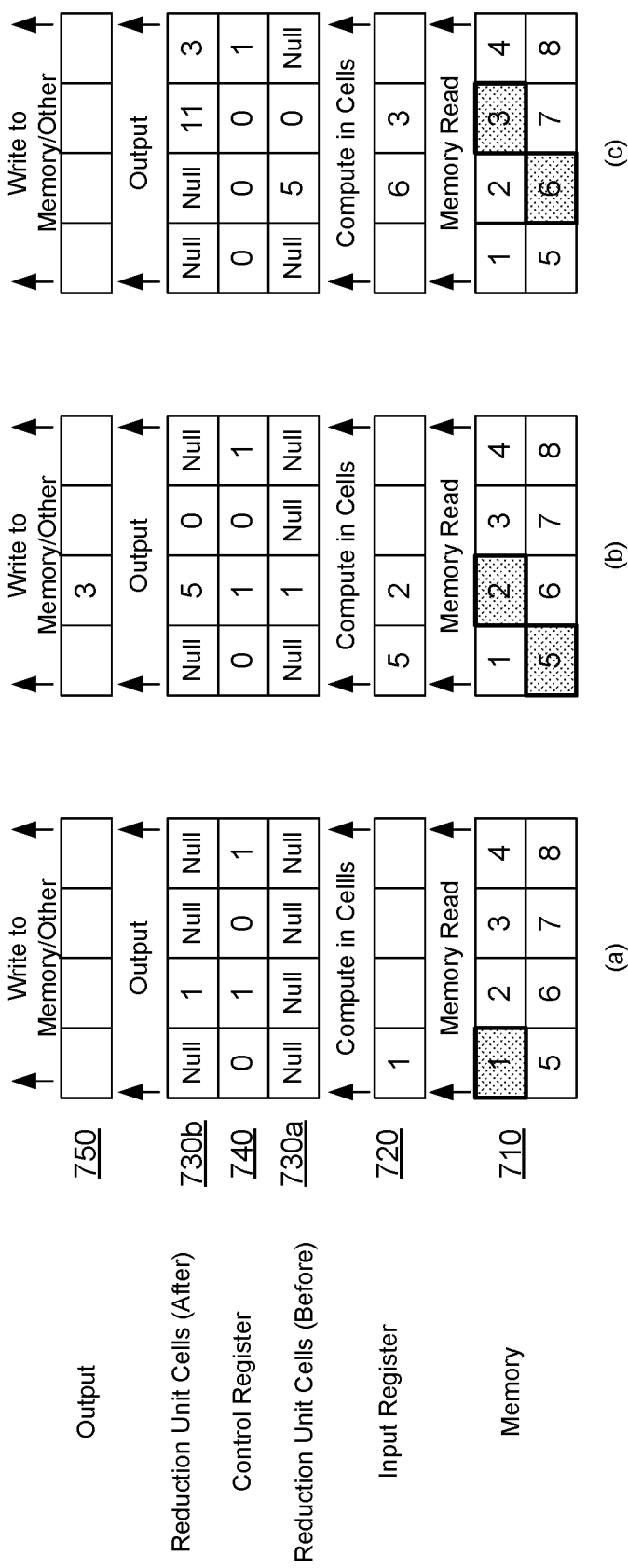
FIGS. 7A-7B depict an example vector reduction using a vector reduction unit in a matrix-vector processing system.
Figure 7B:
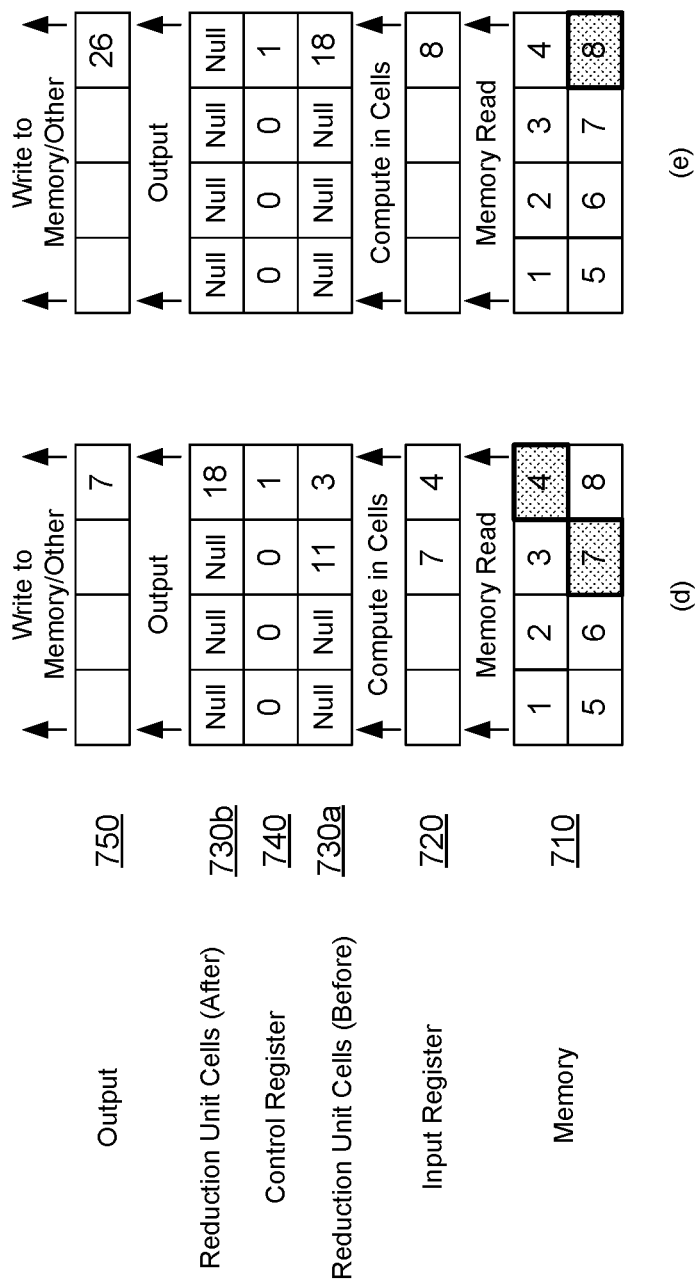

FIGS. 7A-7B show an example of performing a vector reduction in a matrix-vector processor. In some implementations, the example of FIGS. 7A-7B may be performed by the matrix-vector processing system 100 of FIG. 1 that features the special purpose hardware circuit 110, including the vector reduction unit 120. In the example shown in FIGS. 7A-7B, a summation vector reduction operation is performed on two input vectors. The first input vector is the vector [1 2 3 4] and the second input vector is the vector [5 6 7 8]. The summation vector reduction operation performed on the first input vector is a segmented vector reduction operation, such that the result of the vector reduction operation on the first input vector is a two-element vector corresponding to the sum of the elements [1 2] and [3 4] of the first input vector. The summation vector reduction operation performed on the second input vector is not a segmented vector reduction operation, such that the result of performing the vector reduction operation on the second input vector is a scalar corresponding to the sum of the elements [5 6 7 8] of the second input vector.

At each of the frames shown in FIGS. 7A-7B, a memory 710, e.g., a DRAM or SRAM which may be used to implement the memory 208, may be accessed or read as a staggered memory. Thus, at each frame, a staggered memory read is performed and elements of the input vectors are received at the input register 720. The input register 720 may correspond, for example, to the input register 320 of FIG. 3. The input register 720 provides the received elements of the input vectors to the reduction unit cells 730, e.g., the cells 430 of FIG. 4. Each of the frames in FIGS. 7A-7B show the reduction unit cells 730 before a vector reduction operation is performed, in the reduction unit cells before 730a, as well as after a vector reduction operation is performed, in the reduction unit cells after 730b. The frames of FIGS. 7A-7B also show a control register 740, where the contents of the control register 740 correspond to the contents of the control register 415 of FIG. 4 for controlling the vector reduction unit to perform segmented or unsegmented vector reduction operations. Outputs of the reduction of the input vectors are provided to the outputs 750, e.g., similar to the value outputs 440 of FIG. 4.

Briefly, at frame (a) shown in FIG. 7A, a first element of the first input vector have a value of one is read from the memory 710 and received at the input register 720. The cells 730 have been initialized, as shown at 730a, to null, although in other implementations the cells 730 may be initialized to positive infinity, negative infinity, or to another value. The control register 740 has received a vector of elements for implementing the segmented vector reduction operation of the first input vector. The vector of elements is [0 1 0 1] and is provided to the control register 740 such that each element of the vector of elements is a control signal for a corresponding cell 730. Since [0] position of the control register 740 is a zero, i.e., specifying that an unsegmented vector reduction operation is to be performed, the cell 730 receives the first element of the first input vector, sums it with the value currently in the cell 730, and provides the result to a next cell 730. Thus, the first cell 730 performs the operation (Null)+1=1, and sends 1 to the next cell 730, as shown in 730b of frame (a). The contents of the first cell may be reinitialized to null as shown in 730b.

At frame (b), a second element of the first input vector having a value of two, and a first element of the second input vector having a value of 5, are received at the input register 720. The second cell 730 reduction unit sums its currently stored value and the received second element of the first input vector, i.e., performs the operation (1)+2=3. Since element of the control register 740 for the second cell 730 is a one, i.e., specifying that a segmented vector reduction operation is to be performed, the second cell 730 outputs the resulting sum to the second output 750. Additionally, the second cell 730 outputs a zero to the third cell 730. In some instances, the second cell 730 may output a different value, e.g., a null, positive infinity, or negative infinity, to the third cell 730. In some instances, the output 750 may be a single output, e.g., such that all of the cells 730 are connected to the same output 750.

Additionally, the first cell 730 receives the first element of the second input vector, performs the summation (Null)+5=5, and outputs the result to the second cell 730 for storage. Thus, at 730b of frame (b), the second cell 730 stores a value of five. The first cell 730 may be reinitialized to null or to another value, as shown.

At frame (c), a third element of the first input vector and a second element of the second input vector are received at the input register 720. The control register 740 is also updated to include elements for the unsegmented vector reduction operation of the second input vector, since the segmented vector reduction operation of the first input vector has been performed. Thus, only the last element of the control register 740 is a one, such that only a single reduction output will be produced for the second input vector. The third cell 730 stores, as shown at 730a of frame (c), a value of zero, receives the third element of the first input vector having a value of three, performs the operation (0)+3=3, and stores the result in the last cell 730, as shown at 730b. The second cell 730 stores, at 730a, a value of 5, receives the second element of the second input vector having a value of 6, performs the operation (5)+6=11, and stores the result in the third cell 730, as shown at 730b.

At frame (d), the last element of the input register 720 receives a last element of the first input vector having a value of four, and a third element of the second input vector having a value of seven. The last cell 730 receives the last element of the first input vector, sums it with the value stored at the last cell 730, i.e., performs the operation (3)+4=7, and based on the control register 740 storing a one, outputs the result to the last output 750. The third cell 730 receives the third element of the second input vector, sums it with the value stored at the third cell 730, i.e., performs the operation (11)+7=18, and stores the result in the last cell 730, as shown at 730b of frame (d).

At frame (e), the last element of the second input vector having a value of 8 is received at the input register 720. This value is summed with the value currently stored at the last cell 730, i.e., the operation (18)+8=26 is performed. Because the last element of the control register 740 corresponding to the last cell 730 of the reduction unit is a one, the result is output to the last output 750. Thus, the summation vector reductions of both of the input vectors are output. As elements are read out of the cells 730 and not replaced, e.g., with the outputs of preceding cells 730, the contents of the cells 730 may be reinitialized to null or to another value.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can, by way of example, be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
a vector reduction unit configured to perform vector reduction operations for one or more input vectors; the vector reduction unit comprising a plurality of cells, at least one cell of the plurality of cells configured to:
receive an input element from a plurality of input elements included in an input vector;
receive a temporary reduction element that is either an output of a vector reduction operation performed by a cell that precedes the at least one cell or an initialization value from the cell that precedes the at least one cell;
receive a control element from a plurality of control elements included in a control vector that includes a respective control element for each of the plurality of cells; wherein each respective control element indicates to the corresponding cell whether to output a result of the vector reduction operation generated by the corresponding cell to an output circuit or provide the result of the vector reduction operation generated by the corresponding cell to another cell of the plurality of cells;
perform the vector reduction operation using the input element and the temporary reduction element based on the control element to generate an output element; and
in response to the control element indicating not to output the result to the output circuit, provide the output element to another cell of the plurality of cells, the output element being a new temporary reduction element for the other cell.

2. The system of claim 1, wherein the respective control element is configured to indicate whether that the input element is a last input element in the input vector, wherein the corresponding cell is configured to provide the output element to the other cell in response to the respective control element indicating that the input element is not the last input element in the input vector.

3. The system of claim 2, wherein the corresponding cell is further configured to provide the respective output element to the output circuit in response to the respective control element indicating that the input element is the last input element in the input vector.

4. The system of claim 1, further comprising:
an input vector register configured to store the input element of the input vector;
a temporary reduction element register configured to store the temporary reduction element; and
a control vector register configured to store the control element of the control vector.

5. The system of claim 1, wherein the vector reduction operation comprises a maximum vector reduction operation; wherein performing the maximum vector reduction operation comprises:
determining, as the output element, a maximum of the input element and the temporary reduction element.

6. The system of claim 1, wherein the vector reduction operation comprises a minimum vector reduction operation; wherein performing the minimum vector reduction operation comprises:
determining, as the output element, a minimum of the input element and the temporary reduction element.

7. The system of claim 1, wherein the vector reduction operation comprises a summation vector reduction operation; wherein performing the summation vector reduction operation comprises:
determining, as the output element, a sum of the input element and the temporary reduction element.

8. The system of claim 1, wherein the vector reduction operation comprises a product vector reduction operation; wherein performing the product vector reduction operation comprises:
determining, as the output element, a product of the input element and the temporary reduction element.

9. The system of claim 1, wherein the vector reduction operation comprises a mean vector reduction operation; wherein performing the mean vector reduction operation comprises:
determining, as the output element, a mean of the input element and the temporary reduction element.

10. The system of claim 1, wherein the vector reduction operation comprises a maximum index vector reduction operation; wherein performing the maximum index vector reduction operation comprises:
determining a first index corresponding to a position of the input element in the input vector;
receiving data indicating a second index corresponding to the temporary reduction element;
determining a maximum of the input element and the temporary reduction element; and
generating, based on the maximum and as the output element, either the first index or the second index that is associated with the maximum.

11. The system of claim 1, wherein the vector reduction operation comprises a minimum index vector reduction operation; wherein performing the minimum index vector reduction operation comprises:
determining a first index corresponding to a position of the input element in the input vector;
receiving data indicating a second index corresponding to the temporary reduction element;
determining a minimum of the input element and the temporary reduction element; and
generating, based on the minimum and as the output element, either the first index or the second index that is associated with the minimum.

12. The system of claim 1, wherein the initialization value includes at least one of: a null value, a positive infinity, or a negative infinity.

13. A method for performing vector reduction operations in at least one cell of a plurality of cells, comprising:
receiving an input element from a plurality of input elements included in an input vector;
receiving a temporary reduction element that is either an output of a vector reduction operation performed by a cell that precedes the at least one cell or an initialization value from the cell that precedes the at least one cell;
receiving a control element from a plurality of control elements included in a control vector that includes a respective control element for each of the plurality of cells; and wherein each respective control element in the control vector indicates to the corresponding cell whether to output a result of the vector reduction operation generated by the corresponding cell to an output circuit or provide the result of the vector reduction operation generated by the corresponding cell to another cell of the plurality of cells;

performing the vector reduction operation using the input element and the temporary reduction element based on the control element to generate an output element; and in response to the control element indicating not to output the result to the output circuit, providing the output element to another cell of the plurality of cells, the output element being a new temporary reduction element for the other cell.

14. The method of claim 13, wherein the respective control element is configured to indicate whether that the input element is a last input element in the input vector, wherein the corresponding cell is configured to provide the output element to the other cell in response to the control element indicating that the input element is not the last input element in the input vector.

15. The method of claim 14, wherein the corresponding cell is further configured to provide the respective output element to the output circuit in response to the respective control element indicating that the input element is the last input element in the input vector.

16. The method of claim 13, further comprising:
an input vector register configured to store the input element of the input vector;
a temporary reduction element register configured to store the temporary reduction element; and
a control vector register configured to store the control element of the control vector.

17. The method of claim 13, wherein the vector reduction operation comprises at least one of: a maximum vector reduction operation, a minimum vector reduction operation, a summation vector reduction operation, a product vector reduction operation, or a mean vector reduction operation;
wherein performing the maximum vector reduction operation comprises determining, as the output element, a maximum of the input element and the temporary reduction element;
wherein performing the minimum vector reduction operation comprises determining, as the output element, a minimum of the input element and the temporary reduction element;
wherein performing the summation vector reduction operation comprises determining, as the output element, a sum of the input element and the temporary reduction element;
wherein performing the product vector reduction operation comprises determining, as the output element, a product of the input element and the temporary reduction element; and
wherein performing the mean vector reduction operation comprises determining, as the output element, a mean of the input element and the temporary reduction element.

18. The method of claim 13, wherein the vector reduction operation comprises a maximum index vector reduction operation; wherein performing the maximum index vector reduction operation comprises:
determining a first index corresponding to a position of the input element in the input vector;
receiving data indicating a second index corresponding to the temporary reduction element;
determining a maximum of the input element and the temporary reduction element; and
generating, based on the maximum and as the output element, either the first index or the second index that is associated with the maximum.

19. The method of claim 13, wherein the vector reduction operation comprises a minimum index vector reduction operation; wherein performing the minimum index vector reduction operation comprises:
determining a first index corresponding to a position of the input element in the input vector;
receiving data indicating a second index corresponding to the temporary reduction element;
determining a minimum of the input element and the temporary reduction element; and
generating, based on the minimum and as the output element, either the first index or the second index that is associated with the minimum.

20. The method of claim 13, wherein the initialization value includes at least one of: a null value, a positive infinity, or a negative infinity.

* * * * *